No. 670,087. Patented Mar. 19, 1901.
N. STEDMAN.
SHAKING SCREEN.
(Application filed Apr. 7, 1900.)
(No Model.) 2 Sheets—Sheet 2.

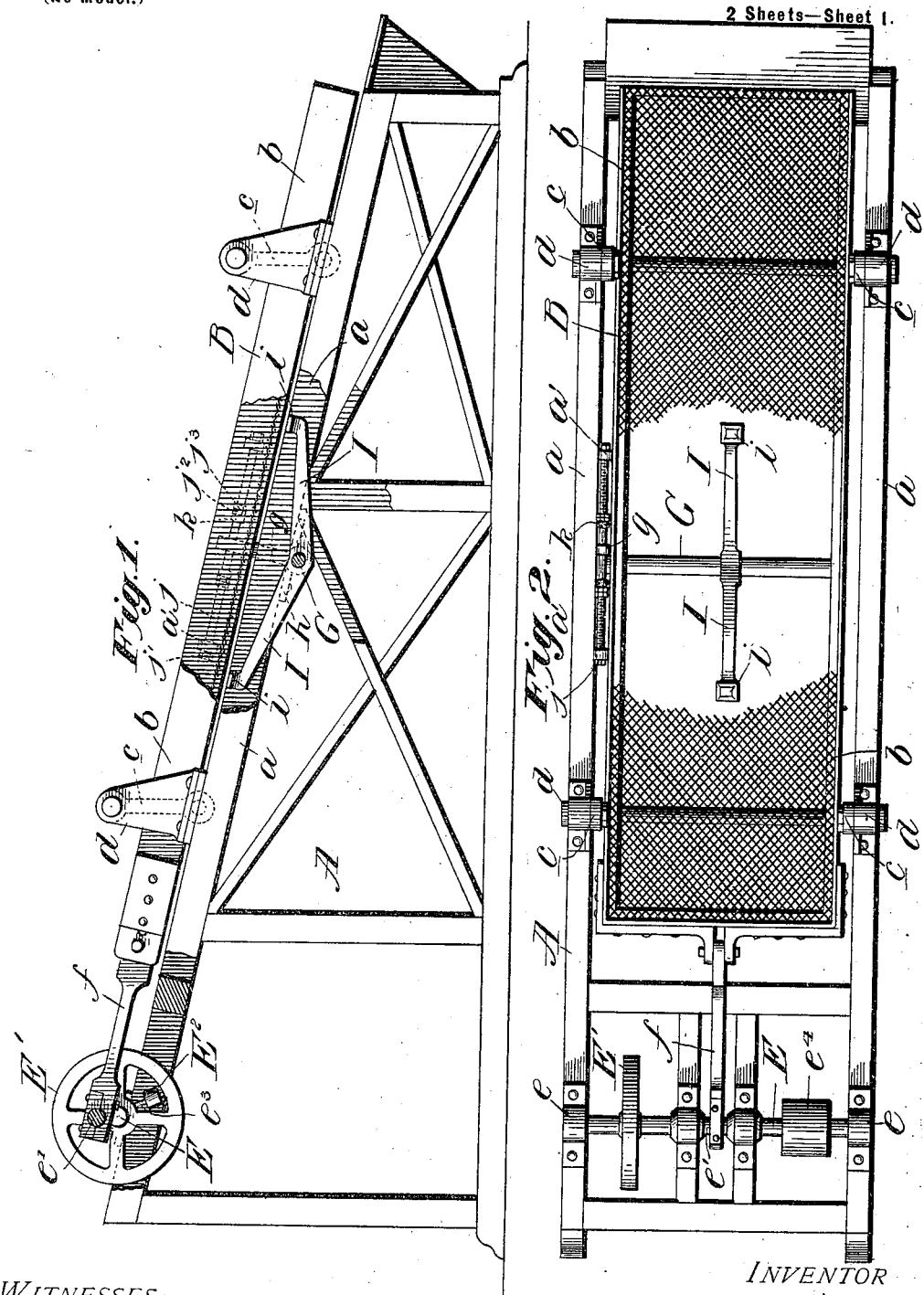

WITNESSES:
L. C. Hills
S. E. Zimmerman

INVENTOR
Nathan Stedman
BY W. W. Dudley
Attorneys

UNITED STATES PATENT OFFICE.

NATHAN STEDMAN, OF AURORA, INDIANA.

SHAKING-SCREEN.

SPECIFICATION forming part of Letters Patent No. 670,087, dated March 19, 1901.

Application filed April 7, 1900. Serial No. 12,015. (No model.)

*To all whom it may concern:*

Be it known that I, NATHAN STEDMAN, (whose post-office address is Aurora, Indiana,) a citizen of the United States, residing at Aurora, in the county of Dearborn and State of Indiana, have invented certain new and useful Improvements in Shaking-Screens; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in the class of screens having means for their vibration and also means in the nature of reciprocating hammers for imparting blows to said screens to prevent clogging.

The object of the invention is the general improvement of the screen whereby increased efficiency and durability are obtained and the provision of a novel and effective impact device which is capable of adjustment to regulate the force of the blow and which is actuated through movement of the screen.

The nature of the improvements will be readily comprehended, reference being had to the following detailed description and to the accompanying drawings, in which—

Figure 3:
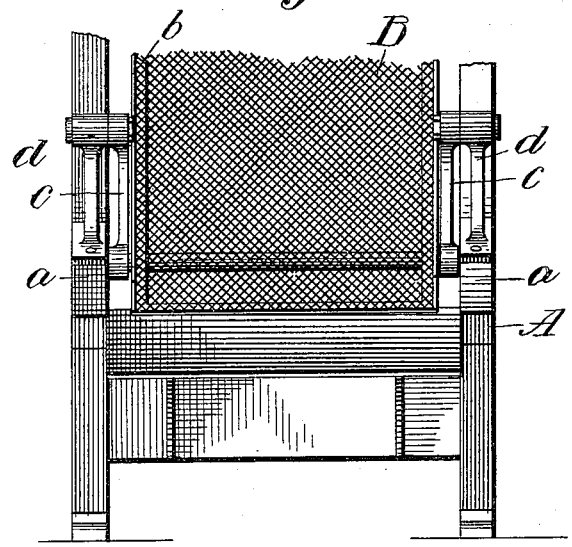
Figure 4:
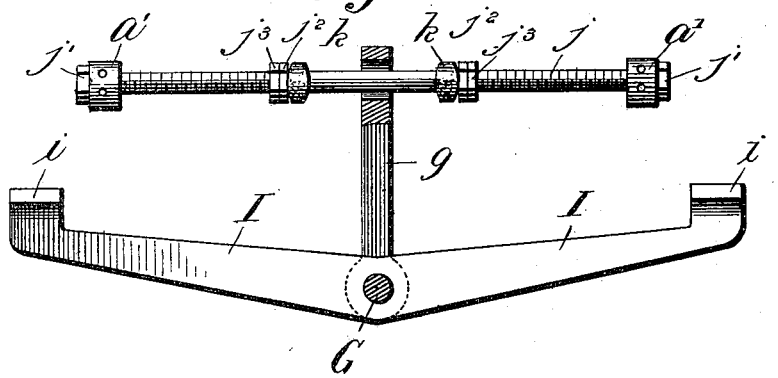

Figure 1 is a side elevation, partly broken away, of a vibrating screen embodying my invention. Fig. 2 is a plan view, partly broken away. Fig. 3 is an end elevation, partly broken away. Fig. 4 is a detail view, enlarged, of the impact device and the means for actuating it.

Referring to the drawings by letter, A denotes the frame, and B is the screen, which is supported in the upper portion of the frame, preferably by hanger-rods $c\,c$, said rods being pivoted to the screen-frame $b$ and to standards $d\,d$, bolted to the upper frame-beams $a\,a$. A transverse shaft E is mounted in bearing-boxes $e\,e$ on the beams $a$, and centrally of the shaft is a crank $e'$, which is connected by a pitman $f$ with one end of the screen. On the shaft is a fly-wheel E', which is provided with a counterbalance-weight $E^2$, adjustably mounted on a spoke $e^3$, whereby said weight is movable to meet the resistance from the screen vibrations. Properly adjusted this weight enables the operation of the screen at a high speed, with the minimum of jar or side motion to the frame A. A pulley $e^4$ on the shaft has belt connection with a suitable source of power.

G denotes a shaft which extends transversely across the screen-frame below the screen about midway of the length of the latter. The shaft is mounted in bearing-boxes $h$, bolted to the under side of the frame-beams $a$. Centrally of the shaft is fixed a lever, the arms I I of which extend longitudinally of the screen, and said arms terminate in upturned heads $i\,i$, which alternaltely strike against the under side of the screen and produce the jar necessary to prevent the screen meshes or orifices from clogging. The vibrating movement of the screen is employed to actuate the lever to produce the blows. This is effected by the following means: Secured to the outer side of one of the side bars of the screen, by means of apertured lugs $a'\,a'$, is a rod $j$, the ends of which are threaded and project beyond the lugs for the reception of nuts $j'\,j'$. The rod $j$ is threaded at each side of its center to receive adjusting-nuts $j^2\,j^2$ and jam-nuts $j^3\,j^3$, and between the adjusting-nuts is confined the upper end of an arm $g$, which is fixed to one end of the shaft G and extends between the screen-frame and beam $a$. The upper end of the arm $g$ is apertured or recessed to receive the rod $j$, and in the vibratory movement of the screen the arm $g$ is carried therewith alternately against rubber or other buffers $k\,k$, interposed between the arm and the adjusting-nuts $j^2\,j^2$, with the result that the lever is rocked and the heads $i\,i$ are carried alternately forcibly against the bottom of the screen. The employment of the rubber or other buffers relieves the frame from jar and vibrations, and by employing buffers of different thicknesses the force of the blows may be regulated, though, if desired, the nuts $j^2$ may be adjusted to or from each other to secure such regulation.

In operation the screen is rapidly reciprocated or vibrated through its connection with the crank-shaft, and in its movement the heads $i$ rapidly produce blows on the screen, the result being high efficiency and largely-increased capacity. The means by which the movement of the screen actuates the impact device greatly simplifies the structure of this class of screens, insures durability and non-liability to disorder, and minimizes the power necessary for the operation.

Obviously in screens of large area more than one impact device may be employed, in which event, however, all of them will be operated through movement of the screen.

I claim as my invention—

1. In combination with a vibratory screen and supporting-frame therefor, a transverse shaft carried by the frame, a plurality of strikers fixed to the shaft, adjustable buffer-shoulders on the screen, and an arm fixed to the shaft and extending between the shoulders.

2. In combination with a vibratory screen and supporting-frame therefor, a transverse shaft carried by the frame, a plurality of arms fixed to the shaft and provided with striking-heads, a rod on the screen, adjusting-nuts and buffers on the rod, and an arm fixed to the shaft and extending between the buffers.

3. In combination with a vibrating screen and supporting-frame therefor, a crank-shaft having pitman connection with the screen, a fly-wheel on the crank-shaft having an adjustable counterbalance-weight, a transverse shaft carried by the frame, a plurality of strikers fixed to the shaft, adjustable buffer-shoulders on the screen, and an arm fixed to the shaft and extending between the shoulders.

In testimony whereof I affix my signature in presence of two witnesses.

NATHAN STEDMAN.

Witnesses:
GEORGE E. DOWNEY,
FRANK B. SHUTTS.